May 14, 1935.  J. L. CREVELING  2,001,568
LUBRICATING DEVICE
Filed Sept. 17, 1931  3 Sheets-Sheet 1
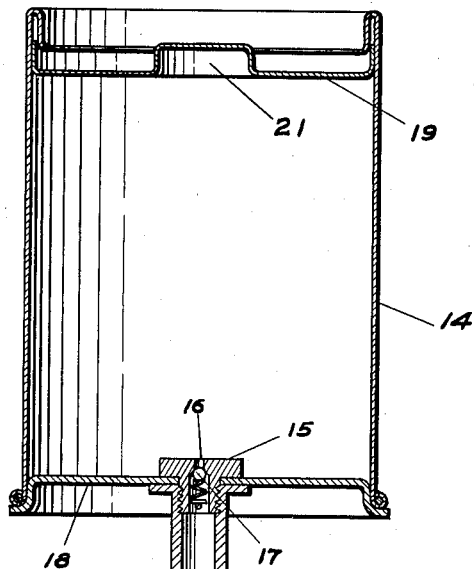
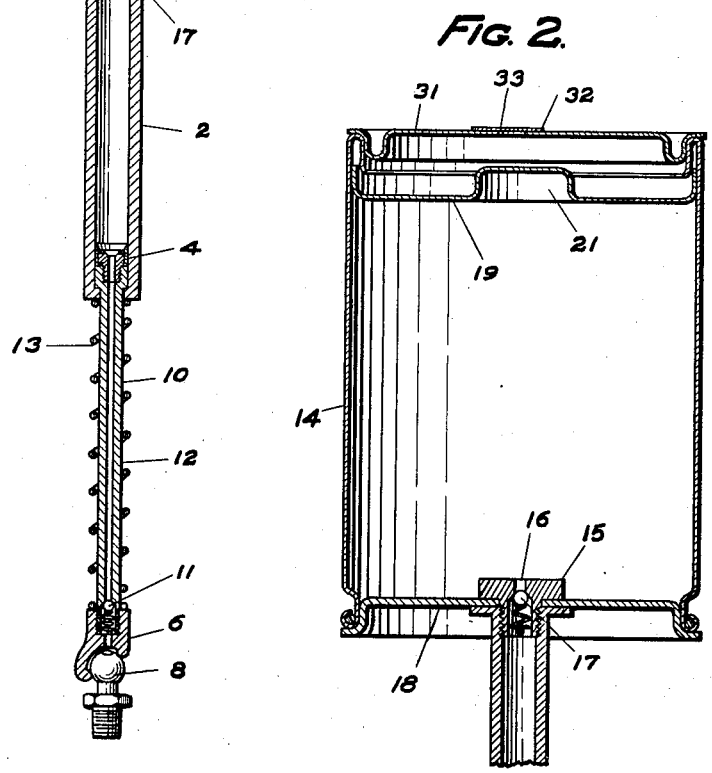
INVENTOR
JOHN L. CREVELING
BY
ATTORNEY May 14, 1935.　　　　J. L. CREVELING　　　　2,001,568
LUBRICATING DEVICE
Filed Sept. 17, 1931　　　3 Sheets-Sheet 2

INVENTOR
JOHN L. CREVELING
BY
ATTORNEY

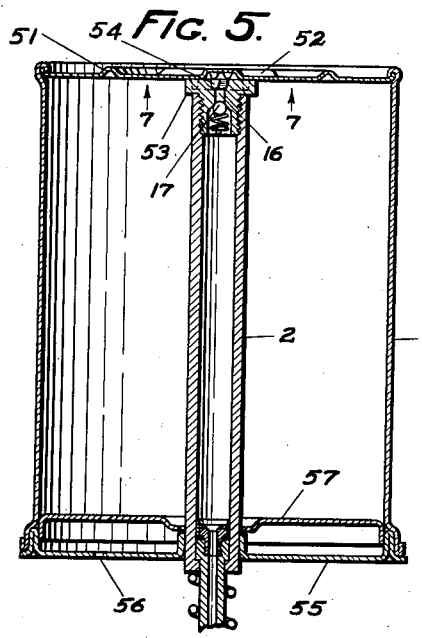
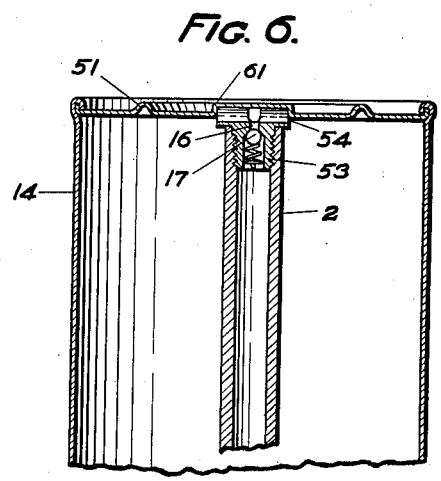
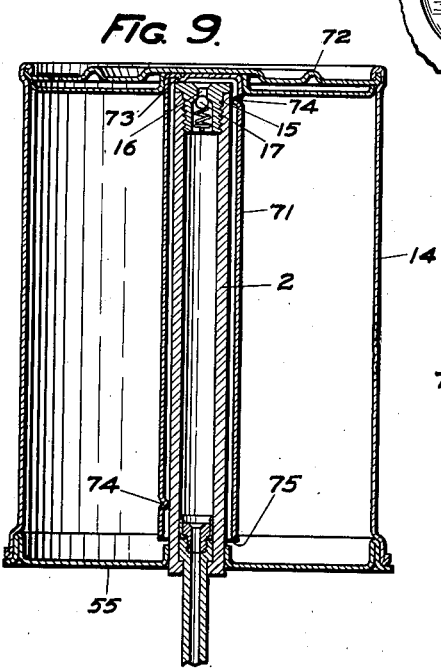
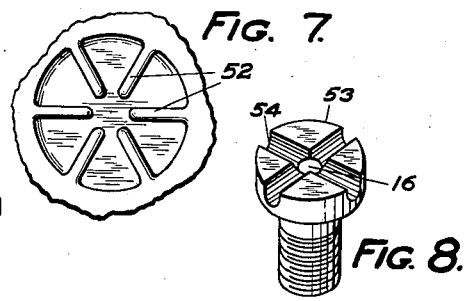
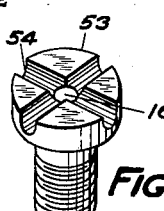
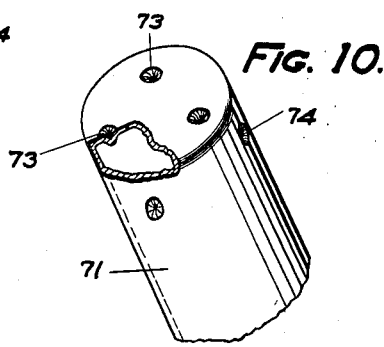
INVENTOR
JOHN L. CREVELING
BY
ATTORNEY Patented May 14, 1935

2,001,568

UNITED STATES PATENT OFFICE 2,001,568

LUBRICATING DEVICE

John L. Creveling, Tucson, Ariz., assignor to The Lubrication Corporation, South Bend, Ind., a corporation of Delaware Application September 17, 1931, Serial No. 563,403

7 Claims. (Cl. 221—47.4)

This invention relates to lubricating devices and is illustrated as embodied in a lubricating compressor of the contact type.

An object of the invention is to provide a lubricating gun that may be used with a quick detachable lubricant conduit.

Another object of the invention is to provide a lubricant gun in which a flange on the outer end of the high pressure cylinder may serve as an attaching means for a removable lubricant container.

A feature of the invention relates to the outer or actuating end of the gun which may be constructed in the form of a disk serving as a closure and securing member for a detachable lubricant container.

Another feature of the invention relates to the arrangement of the high pressure cylinder which projects within the detachable lubricant container and contacts with the outer end thereof to support the container.

Other features and objects of the invention, as well as the details of construction and arrangement of parts, will be apparent from the following description in connection with which I have illustrated several embodiments in the accompanying drawings in which:

Figure 1 is a sectional view through a lubricant gun with one form of quick detachable lubricant container installed thereon.

Figure 2 is a similar view showing a slightly modified form of container;

Figure 5 is another modified form in which the high pressure cylinder is within the detachable container;

Figure 6 is another modified form illustrating a means for supporting the container by the end portion of the high pressure cylinder;

Figure 7 is an enlarged view taken in the direction of arrows 7—7 of Figure 5 illustrating the arrangement of ribs on the container end wall.

Figure 8 is an enlarged perspective view of the high pressure cylinder inlet fitting shown in Figures 5 and 6;

Figure 9 is a view of still another modified form showing the high pressure cylinder surrounded by a tube which serves as a lubricant conduit; and Figure 10 is an enlarged perspective view of the tube illustrated in Figure 9 and having a portion broken away to illustrate the locating indentations.

Figure 3:
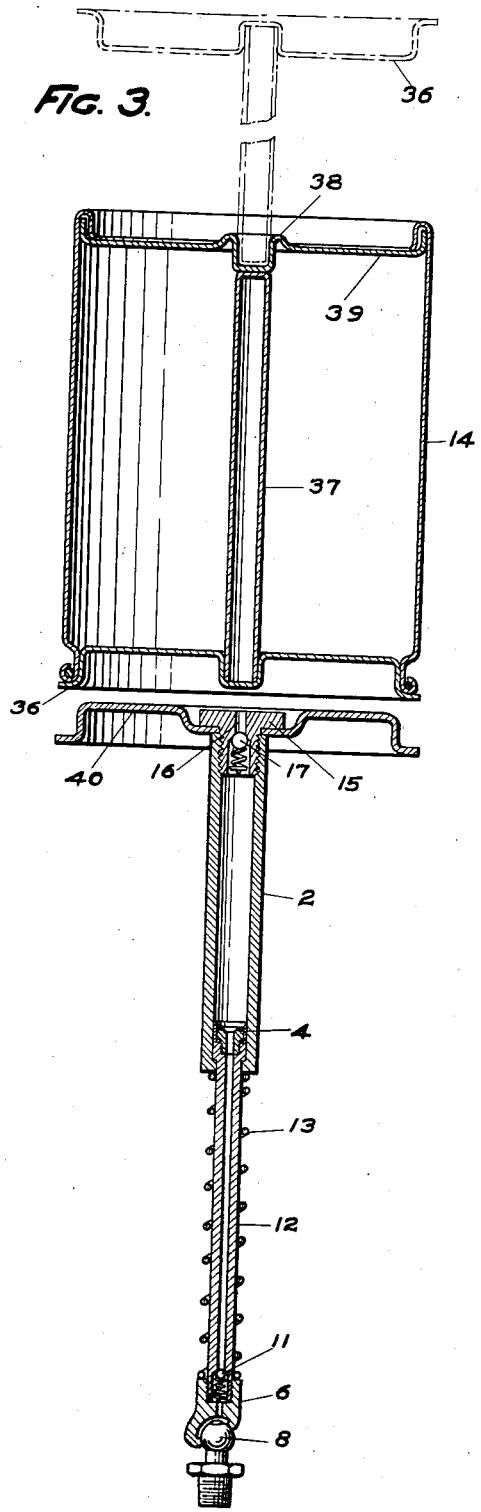
Figure 3 shows another modified form of container in which a removable closure serves as a thrust member to force lubricant to the high pressure cylinder.

Referring to Fig. 1, 2 is a high pressure lubricant cylinder in which reciprocates piston 4, having a contact coupling 6 adapted to engage fitting 8, and supply lubricant through conduit 10 in piston stem 12. A spring pressed check valve 11 is positioned in the conduit 10 in the stem 12. A compression spring 13 coacts between the end of cylinder 2 and coupling 6, for urging piston 4 outwardly to fill the cylinder 2 with lubricant from the detachable container 14. At the inlet end of cylinder 2 is a fitting 15 having a threaded engagement with the cylinder and a passage 16 normally closed by a check valve 17. A flange 18 is clamped between the fitting 15 and cylinder 2, the flange serving as a closure and locating member for the detachable container 14 within which is a slidable follow-up piston 19 that normally contacts the supply of lubricant within the container and is adapted to remain in contact with the lubricant until the entire supply has been exhausted and fitting 15 has been received within the pocket 21.

In the operation of the gun, removable lubricant container 14 is assembled in position on flange 18 as shown in Fig. 1, and a thrust movement imparted to the container which telescopes piston 4 within the cylinder 2 and exhausts the air or other medium present in the cylinder prior to the installation of the container. Upon release of the gun, the piston will assume its normal position by reason of spring 13 and lubricant will be drawn past check valve 17 and fill the cylinder, and from which it may be forced to the fitting 8 by a thrust movement of the gun.

The general type of high pressure cylinder and piston has been disclosed and claimed in my co-pending application, Serial No. 563,401, filed September 17, 1931, but attention herein is called to the importance of having the area of piston 4 greater than the projected grease contact area on fitting 8, for otherwise the pressure of the lubricant would force coupling 6 out of contact with the fitting. However, if the gun be equipped with a clamp-type nozzle-coupler such, for instance, as that illustrated in Morris Patent 1,749,830, the area of the piston 4 may be less than the effective grease contact area on the fitting.

In the form shown in Figure 2, the container 14 is provided with a removable cover 31 which is adapted, when the container is separated from the other gun parts, to form a closure for the opposite end of the container to that at which the closure is shown. Thus it may serve as a closure for said other end when the container is removed from the gun parts for any reason, and it usually serves as a closure for the container during storage and transportation of the container. When the container is assembled with the gun parts, as shown in Figure 2, the cover 31 serves as a closure for the end of the container adjacent to the initial position of the slidable follower piston 19 and serves as a surface against which the operator may press while operating the gun. If desired, a frangible sealing member 32 may be used to close the atmospheric opening 33, the frangible member 32 being selected to be easily perforated by any sharp instrument (not shown) if it is desired to provide an air vent.

In the form shown in Fig. 3, the removable closure 36 is provided with an inwardly extending integral stem 37, which after installation of the removable container 14 on the flange 40, may be seated in socket 38 formed on the follow up piston 39 and closure member 36 used as a thrust device to either actuate the gun or to press the follow up piston 39 against the lubricant. The socket 38 may be threaded or otherwise suitably preformed for attachment of the stem 37, if desired. Compressor spring 13 is not essential with any of the forms herein illustrated, but it is more easily eliminated from the form shown in Fig. 3 than from the forms shown in Figs. 1 and 2, because of the provision of the detachable thrust member 36, which will force piston 4 to the position shown in the drawings when lubricant from the container 14 is forcibly introduced into the high pressure cylinder 2.

Figure 4:
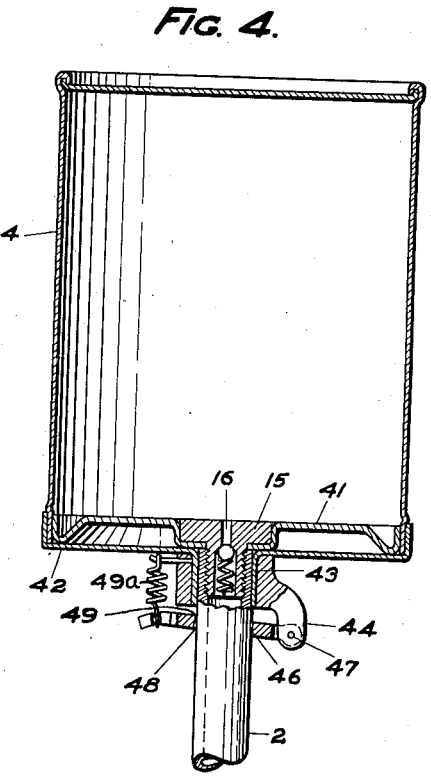
Figure 4 is another modified form of gun in which the high pressure cylinder is connected to the container by means of a one-way latch mechanism that permits the operator to either impart a thrust force to the high pressure cylinder or to move the container relative to the cylinder for filling the same.

In the form shown in Fig. 4, high pressure cylinder 2 is provided at its upper end with a follow up piston 41 which is clamped between fitting 15 and the cylinder and has a slidable relation with the inner walls of the container 14. A flange member 42 is slidably mounted upon cylinder 2 and serves as a closure and retainer member for the removable container 14. Secured to the tubular portion 43 of the flange 42, is a bracket 44 having a latch member 46 hinged thereto at 47. The latch member is provided with a clearance hole, 48, the edge 49 of which engages cylinder 2 when its outer end is drawn toward flange 42 by spring 49ª.

In the operation of the gun shown in Fig. 4, the latch member 46 is manually held released against the tension of spring 49ª and a thrust force applied to the container 14 moves the piston 41 within the container to force lubricant past the check valve 16 into the cylinder 2. After cylinder 2 has been filled with lubricant, latch 46 is released and further thrust causes the piston and cylinder which may be similar to the one shown in Figs. 1 and 3, to be telescoped and eject the lubricant under high pressure to the fitting.

In the form shown in Figure 5, high pressure cylinder 2 projects within the removable container 14 and contacts with the outer end wall thereof which is provided with an annular rib 51 and a series of radial ribs 52. Fitting 53 is preferably provided with lubricant grooves 54 which have a different angularity from the ribs 52 and prevent the grooves 54 from being closed by the ribs regardless of the position of detachable container 14 with reference to the cylinder 2. It is to be understood that either the ribs 52 or the grooves 54 may be omitted, but it is necessary that one or the other of these devices be provided. A flange 55 is secured to the cylinder 2 at a point remote from the fitting 53 which acts as a closure and retaining member for the container 14. If desired, an air vent 56 may be provided for preventing a vacuum from being formed on the under side of the slidable follow-up piston 57, but ordinarily there is sufficient leakage between the flange 56 and the container to obviate the necessity for an air vent.

In the form shown in Figure 6, the radial ribs have been omitted and a depression 61 has been substituted therefor which engages the sides of fitting 53 and acts as a support to prevent displacement of the outer end of the container 14 with reference to the cylinder 2. Care should be taken that depression 61 is of sufficient depth not to obstruct the openings of grooves 54 which serve as the entrance for the lubricant to the cylinder 2.

In the form shown in Figure 9, a concentric tube 71 has its outer closed end contacting with cover 72 and encloses the high pressure cylinder 2 in spaced relation thereto throughout its length. Locating indentations 73 and 74 are formed in tube 71 and locate cylinder 2 both in an axial and radial direction whereby a clearance passage is maintained around cylinder 2. Tube 71 terminates adjacent the flange 55 which is secured to cylinder 2, and in the operation of the gun the lubricant flows from the container 14 through the open end 75 of tube 71 toward the cover 72 and through passage 16 in fitting 15 to the high pressure cylinder 2. Before assembling the gun parts with the container 14, the shell 71 may be removed from its association with the high pressure cylinder 2 and filled with lubricant to a suitable extent so that the gun will be primed and thus ready for immediate operation.

While I have illustrated and described several embodiments of my invention, it is to be understood that this showing and description are illustrative only and that I do not regard the invention as limited to the forms shown and described, or otherwise, except by the terms of the following claims.

I claim:

1. In combination, a lubricating gun including a pressure pump having a pump cylinder provided with an inlet passageway, a lubricant cartridge comprising an original lubricant package, said package being open at one end, a follower piston in said cartridge located between the opposite end of the cartridge and its lubricant contents, and a member providing a lubricant tight quick attachable-detachable friction type closure for said open end of said cartridge, said closure being substantially permanently fixed to said lubricant gun, said closure being disposed in a plane substantially perpendicular to the axis of said pump cylinder, said lubricant inlet passageway being located inwardly of the inner side of said lubricant cartridge closure member, said pump being so arranged with respect to said closure as to tend to tighten the closure during the normal pressure stroke of the pump.

2. A lubricating gun comprising a high pressure cylinder, a lubricant container detachably secured thereto, a follow-up piston in the container, a thrust member having a stem adapted to contact the piston for applying manual thrust to the same, and said member being also adapted to form a closure for the container when the container is removed from the gun.

3. A lubricating gun comprising a high pressure cylinder having a flange secured thereto, a lubricant container detachably secured to the flange and enclosing the cylinder, a follow-up piston in the container surrounding said cylinder and mounted for movement along the axis of the cylinder, said cylinder having a supporting contact with the container end wall.

4. A lubricating gun comprising a high pressure cylinder having a lubricant entrance at its rearward end, a flange secured thereto remote from the entrance, a lubricant container enclosing the cylinder and detachably secured to the flange, and a tube secured to the end wall of the container and surrounding the cylinder in spaced relation thereto and terminating adjacent to the flange, said tube constituting a lubricant conduit between the container and the cylinder entrance.

5. A lubricating gun comprising a high pressure cylinder having a lubricant entrance at its rearward end, a flange secured thereto remote from the entrance, a lubricant container enclosing the cylinder and detachably secured to the flange, a tube secured to the end wall of the container and surrounding the cylinder in spaced relation thereto and terminating adjacent to the flange, said tube constituting a lubricant conduit between the container and the cylinder entrance, and a follow-up piston in the container slidable upon the tube.

6. In combination, a reservoir unit and a gun unit; said reservoir unit comprising, an original lubricant container having a substantially fixed end and an open end, said fixed end having a central internal depression therein, said open end being normally closed by a friction type lid, and a follower having a central opening therethrough disposed in the container; said gun unit comprising, a cylinder having an inlet opening at one end, an inwardly opening check valve for closing said inlet opening, a discharge tube adapted at one end to telescope into said cylinder from the end of the cylinder opposite to its inlet end, a piston on said end of the discharge tube within said cylinder, and a friction type cover secured to said cylinder concentrically about its discharge tube end; said gun unit cylinder being insertable into said container and through the opening in said follower to dispose the inlet end of the cylinder adjacent to said depression in the fixed end of the container, said follower being slidable on said cylinder, and said friction type cover being adapted frictionally to engage with and to close the open end of said container when said cylinder is disposed in said container.

7. A container for lubricant comprising, an open ended receptacle, a closure for one end, a closure for the other end having a rod fastened to the inside thereof, said rod extending throughout the container to contact with the first named closure whereby the second named closure may be removed from the container together with said rod to serve as a handle for pushing the other closure longitudinally of the container.

JOHN L. CREVELING.